United States Patent

[11] 3,603,840

| [72] | Inventor | Gideon A. DuRocher<br>Mount Clemens, Mich. |
|---|---|---|
| [21] | Appl. No. | 771,233 |
| [22] | Filed | Oct. 28, 1968 |
| [45] | Patented | Sept. 7, 1971 |
| [73] | Assignee | Essex Wire Corporation<br>Fort Wayne, Ind. |

[54] VARIABLE INTENSITY VEHICLE-SIGNALING SYSTEM
6 Claims, 6 Drawing Figs.

[52] U.S. Cl. .................................................. 315/82,
307/10, 315/77, 315/83, 340/74
[51] Int. Cl. ...................................................... B60q 1/38
[50] Field of Search .......................................... 315/82, 83,
77; 307/9, 10; 340/74, 76

[56] References Cited
UNITED STATES PATENTS

| 3,040,207 | 6/1962 | Grontkowski | 315/82 X |
| 3,196,311 | 7/1965 | Bleiweiss et al. | 315/82 X |
| 3,267,426 | 8/1966 | Parkes | 315/83 X |
| 3,277,442 | 10/1966 | Kearney | 315/82 X |
| 3,316,441 | 4/1967 | Nallinger | 315/83 |

*Primary Examiner*—Roy Lake
*Assistant Examiner*—E. R. LaRoche
*Attorney*—Learman & McCulloch

ABSTRACT: Variable intensity signaling apparatus for a vehicle having operating lamps operable in response to opening and closing of an operating lamp switch and also having stop signal lamps, turn signal lamps and hazard signal lamps operable independently of the operating lamp switch, the signaling lamp circuits including dimming resistances operable in response to operation of the operating lamp switch to vary the brilliance of the signal lamps. The material from which the resistances are formed is temperature sensitive, the resistance varying directly with the temperature.

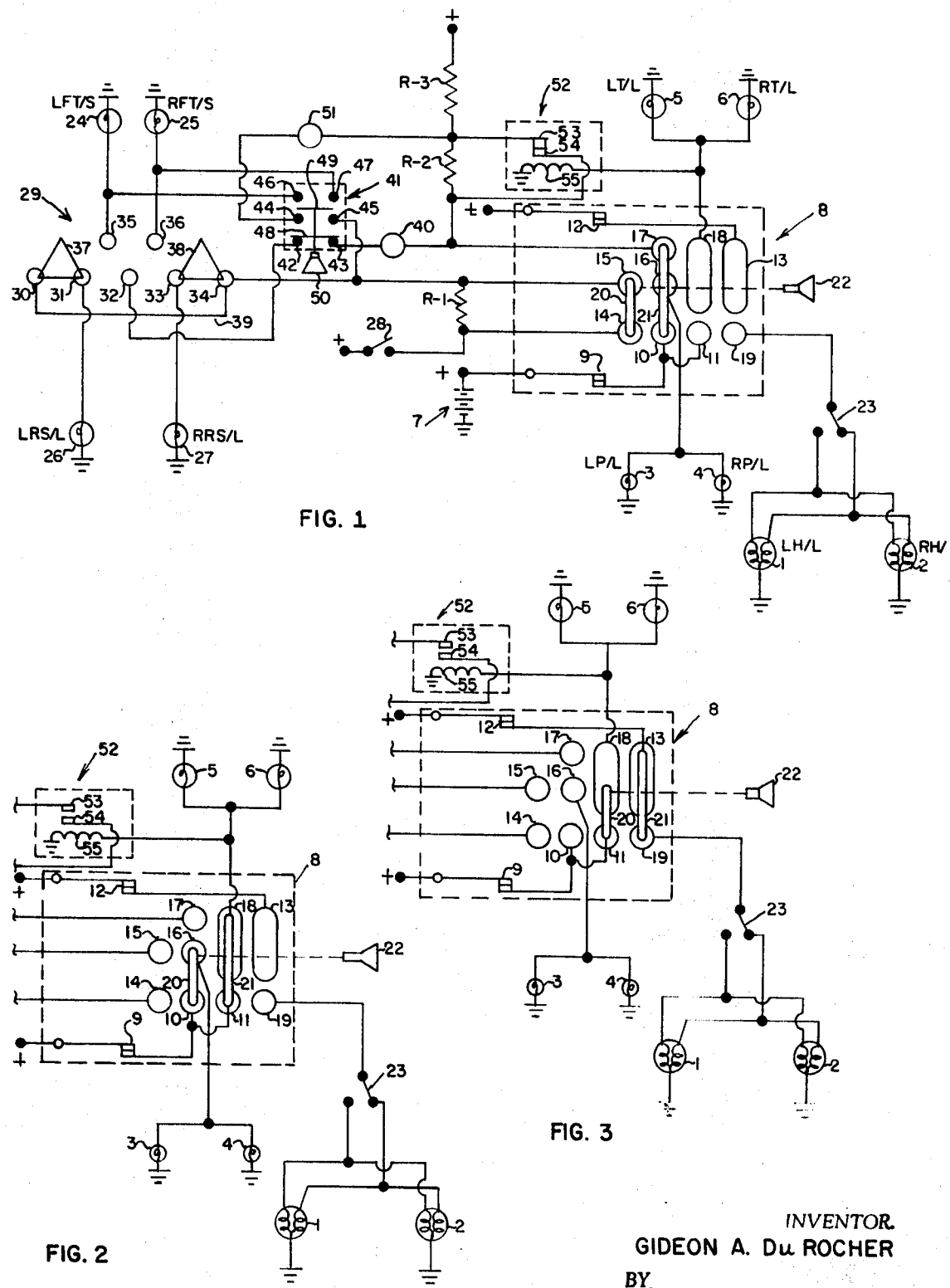

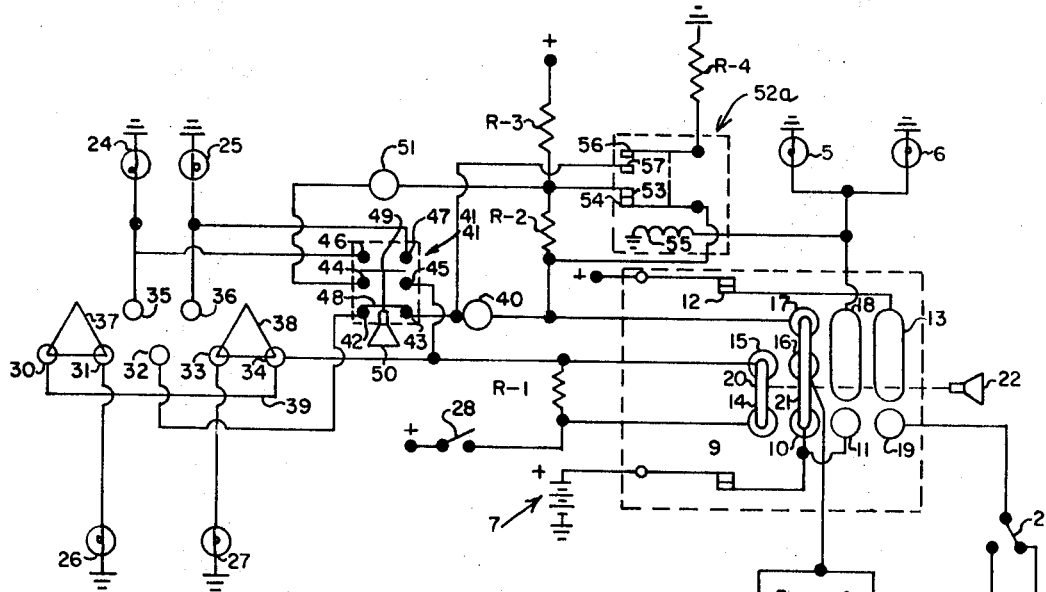
FIG. 4
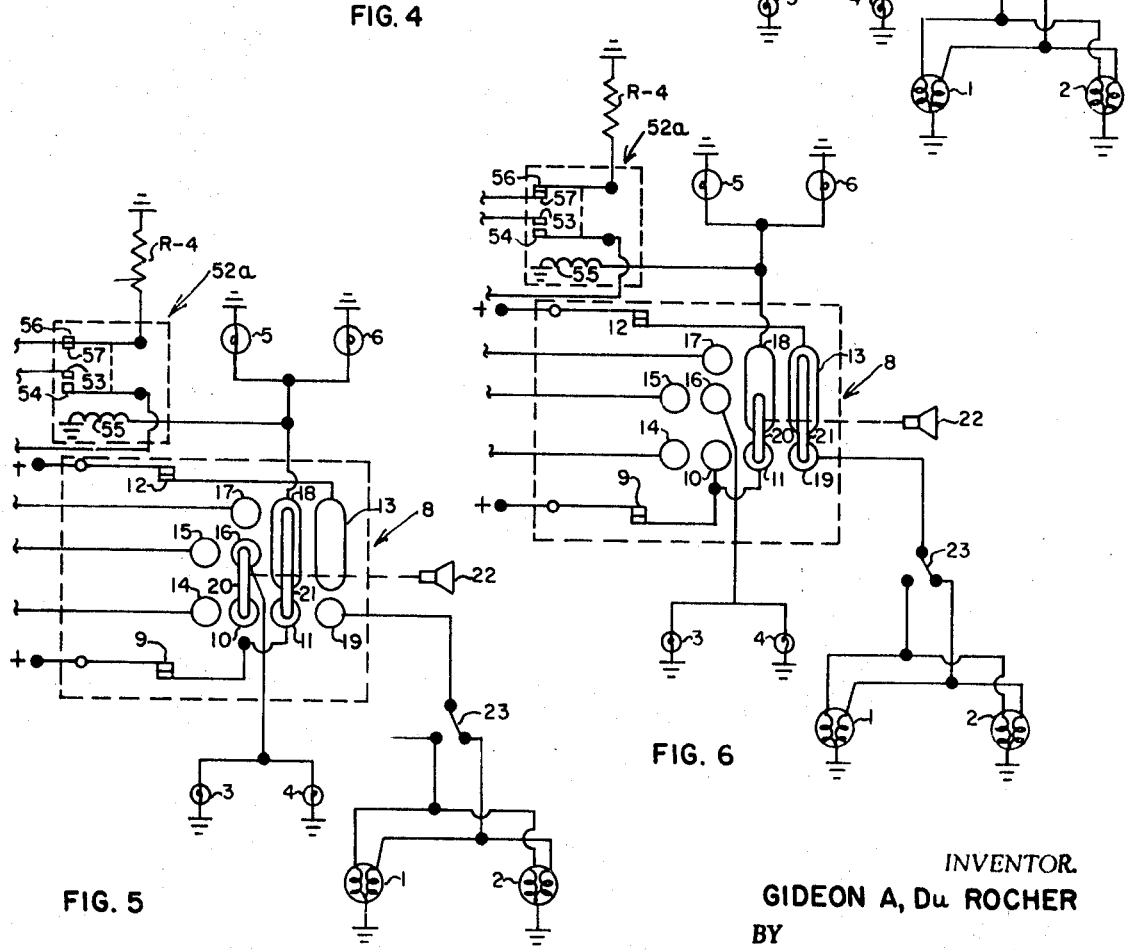
FIG. 5
FIG. 6
INVENTOR.
GIDEON A. Du ROCHER
BY
Learman + McCulloch

VARIABLE INTENSITY VEHICLE-SIGNALING SYSTEM

The disclosed invention relates to electrical signaling systems for vehicles of the kind including left-hand and right-hand direction signaling lamps, hazard warning signaling lamps, stop signaling lamps, and illuminating or operating lamps. More particularly, the invention relates to apparatus for varying the intensity of the signaling lamps indirectly according to the ambient light.

Current vehicles include two or more headlamps, left and right parking lamps, and left and right tail lamps, such lamps hereinafter being referred to individually and collectively as operating lamps, which are connected in an operating lamp circuit to a battery or other source of electrical energy and which are controlled by a manually operable switch. Such vehicles also include left-hand and right-hand direction signal lamps, left-hand and right-hand hazard warning signal lamps, and stop signal lamps, such lamps hereinafter being referred to individually and collectively as signaling lamps. The direction signal lamps and the hazard warning lamps may be the same, and the stop lamps may be the same as the rear direction signal and hazard warning lamps. Alternatively, the signaling lamps may constitute additional filaments in the same bulbs housing the parking and tail lamp filaments.

During daylight hours actuation of any of the signaling lamps should cause the lamps to burn with such intensity as readily to be observed by the drivers of approaching vehicles. During the hours of dusk and darkness, however, the intensity necessary for daylight operation of the signaling lamps may be such as to create glare. This problem has been recognized heretofore, and many proposals have been advanced to remedy or alleviate the problem. Not all of the prior proposals have been satisfactory, however, for a number of reasons. For example, various proposals have been made by means of which the brilliance of the turn signal lamps may be reduced in response to operation of the vehicle's headlamp switch, but no provision has been made for reducing the brilliance of the stop signal lamps or the hazard signal lamps. Moreover, some of the flasher units, by means of which the turn signal and hazard signal lamps are caused to flash, are designed to flash at a predetermined rate in accordance with the current supplied to them. If the current is reduced, as is required for dimming of the signal lamps, then the rate at which the flasher unit operates may be considerably less than that required for safety.

Another difficulty frequently encountered in prior art variable intensity systems is that considerable, and frequently expensive, modification of a vehicle's electrical circuit is required. In many instances, the modification of the circuit requires the addition of expensive components which, unless equipped with overload protective means, may be subjected to voltages or currents in excess of their capacity. If such safety overload protective means are included the cost of the variable intensity system is increased. If such safety overload protectors are not included, then the life of the system may be reduced materially.

An object of this invention is to provide an improved variable intensity system for all of the signaling lamps of a vehicle and which is operative automatically in response to the operation of the control means for the vehicle's operating lights.

Another object of the invention is to provide a variable intensity system of the kind referred to wherein the control of the brilliance of the signaling lamps is effected by inexpensive resistances adapted to be inserted in and withdrawn from the signaling lamp circuit according to the position in which the operating lamp switch is placed.

A further object of the invention is to provide resistances for the signaling lamp circuit in which the resistance increases with an increase in temperature, thereby enabling the signaling lamps to flash initially at a relatively high level intensity and subsequently to flash at a relatively low level intensity.

Another object of the invention is to provide a variable intensity signaling system for use in vehicle signaling lamp systems and which is operable to maintain the flashing rate of the signaling lamps in accordance with the recommended rate.

A further object of the invention is to provide a variable intensity signaling lamp system for a vehicle and in which the signaling lamp circuits are protected against overload by the same protective means incorporated in the operating lamp circuits.

Other objects and advantages of the invention will be pointed out specifically or will become apparent from the following description when it is considered in conjunction with the appended claims and the accompanying drawings, in which:

FIG. 1 is a schematic view of a typical vehicle's operating and signaling lamp circuits according to one embodiment of the invention;

FIG. 2 is a schematic view of a portion of the apparatus shown in FIG. 1 and illustrating certain parts in adjusted positions;

FIG. 3 is a view similar to FIG. 2, but illustrating the operating parts in another position of adjustment;

FIG. 4 is a view similar to FIG. 1, but illustrating another modification of the invention;

FIG. 5 is a schematic view of a portion of the apparatus shown in FIG. 4, but illustrating certain operating parts in adjusted positions; and FIG. 6 is a view similar to FIG. 5, but illustrating the parts in another position of adjustment.

Apparatus constructed in accordance with the embodiment illustrated in FIGS. 1, 2 and 3 is adapted for use in a vehicle having an operating lamp circuit including left and right headlamps 1 and 2, left and right parking lamps 3 and 4, and left and right tail lamps 5 and 6. The operating lamps are adapted to be connected to and disconnected from a battery 7 or source of electrical energy through an operating lamp control switch 8. The control switch 8 includes a circuit breaker 9 connected to the positive terminal of the battery 7 and to a pair of fixed contacts 10 and 11 mounted in the switch 8. A second circuit breaker 12 also is connected to the positive terminal of the battery 7 and to a fixed contact 13 carried by the switch 8. The switch 8 also is provided with fixed contacts 14, 15, 16, 17, 18 and 19 and a pair of movable contacts 20 and 21 which are carried by a movable operating member 22 and move with the latter into and out of engagement with selected fixed contacts.

When the operating member 22 and the movable contacts 20 and 21 are in the inoperative positions shown in FIG. 1, the contact 20 bridges the fixed contacts 14 and 15 and the movable contact 21 bridges the contacts 10 and 17, but it is so shaped as to be free from the contact 16. In these positions of the contacts 20 and 21, the operating lamp circuit is disconnected from the battery. Consequently, none of the operating lamps will be illuminated. When the operating member 22 is moved to a first operating position illustrated in FIG. 2, however, the movable contact 20 will bridge the contacts 10 and 16, thereby effecting illumination of the parking lamps 3 and 4. The contact 21 will bridge the contacts 11 and 18, thereby effecting illumination of the tail lamps 5 and 6. When the operating member 22 is moved to a second operating position shown in FIG. 3, the movable contact 20 will bridge the contacts 11 and 18, thereby effecting illumination of the tail lamps 5 and 6, and the contact 21 will bridge the fixed contacts 13 and 19, thereby effecting illumination of either the high beam or the low beam of the head lamps 1 and 2 depending on the position of a manually controllable headlamp beam switch 23. The circuit breaker 9, in both of the operating positions of the switch 8, will protect the circuits to the tail lamps and parking lamps, and the circuit breaker 12 will protect the circuit to the headlamp when the switch 8 is in the position illustrated in FIG. 3.

The circuitry illustrated in FIGS. 1–3 also includes left and right front turn signaling lamps 24 and 25 and left and right rear turn signaling lamps 26 and 27. The turn signaling lamps may be independent of the parking and tail lamps or, if desired, the envelopes or bulbs containing the filaments of the parking lamp and tail lamps may include additional filaments which function as the turn signaling lamps. The filaments of the turn signaling lamps conventionally emit light of greater intensity than that of the parking and tail lamp filaments, and the filaments of the rear turn signaling lamps conventionally function as stop lamps in response to the application of the vehicle's brakes. In the disclosed embodiment, the circuitry includes a brake operated switch 28 connected to the fixed contact 14 and to the positive terminal of the battery 7 and which closes automatically in response to the application of the vehicle's brakes so as to illuminate the left-rear and right-rear lamps 26 and 27 which thus function as stop signal lamps.

Operating means for the direction signaling lamps is indicated generally by the reference character 29 and comprises a plurality of fixed contacts 30, 31, 32, 33, 34, 35 and 36 and a pair of movable contacts 37 and 38. The contacts 30 and 34 are bridged by a jumper 39, the contacts 31 and 33 are connected to the rear signaling lamps 26 and 27, respectively, the contacts 35 and 36 are connected to the front signaling lamps 24 and 25, respectively, and the contact 32 is connected to the fixed contact 17 via a flasher unit 40 and a hazard warning operating switch 41. The direction signal operating switch 29 is conventional and, when the movable contacts 37 and 38 are in the positions shown in FIG. 1, none of the signaling lamps are illuminated, but a circuit may be completed to the rear signaling lamps 26 and 27, upon closing of the brake switch 28, via the fixed contacts 14 and 15, the movable contact 20, the fixed contacts 30, 31, 33 and 34 and the movable contacts 37 and 38.

Should the direction signal operating switch 29 be manipulated to indicate a right-hand turn, for example, the movable contact 38 will move to the left, thereby connecting the right rear signaling lamp 27 and the right front turn signaling lamp 25 to the battery 7 via the hazard warning operating switch 41, the flasher 40, the fixed contacts 17 and 10, the movable contact 21 and the circuit breaker 9. The right front and right rear signaling lamps 25 and 27, respectively, thus will flash on and off at the rate determined by the flasher unit 40, the circuit breaker 9 serving as an overload protector.

The operation of the left-hand direction signaling lamps is similar to that just described, with the exception that the movable contact 37 is adjusted to the right so as to bridge the contacts 31, 32 and 35 and effect flashing of the left-hand signaling lamps 24 and 26.

The hazard warning operating switch 41 includes three sets of fixed contacts 42 and 43, 44 and 45, and 46 and 47, and two movable contacts 48 and 49 which are carried by and move with a movable operating member 50 having a conductive part joining the contacts 48 and 49. The contacts 42 and 43 are in circuit of the flasher 40, the contacts 44 and 45 are in the circuit of the brake switch 28 and a second flasher unit 51, and the contacts 46 and 47 are in the circuit with the front signaling lamps 24 and 25. The second flasher unit 51 is connected to the positive terminal of the battery 7 by means which subsequently will be described.

The construction and arrangement of the hazard warning operating switch 41 are such that, when the operating member 50 is in its inactive position as illustrated in FIG. 1, the movable contact 48 bridges the contacts 42 and 43 so as to provide circuit continuity for the operation of the left-hand or the right-hand direction signal lamps when the direction signal contacts 37 and 38 are moved from their neutral positions. When the operator 50 is in its operative position, however, the movable contact 48 bridges the contacts 44 and 45 and the movable contact 49 bridges the fixed contacts 46 and 47 so as to effect simultaneous flashing of all of the direction signal indicating lamps, thereby providing a hazard warning signal.

In the embodiment illustrated in FIGS. 1, 2 and 3, three resistances R-1, R-2 and R-3 are provided for the purpose of reducing the intensity or brilliance of the signaling lamps under the control of the operating lamp switch 8. The resistance R-1 is connected in parallel with the fixed contacts 14 and 15 and is shunted by the movable contact 20 when the latter bridges the contact 14 and 15. When the control switch operator 22 is moved from the position shown in FIG. 1 to either of the positions shown in FIGS. 2 or 3, however, the movable contact 20 disengages the contacts 14 and 15, thereby inserting the resistance R-1 in the stop signal lamp circuit. Closing of the brake switch 28 under these conditions will energize the lamps 26 and 27 via the resistor R-1, thus dimming the intensity of the light emitted by the lamps.

The resistors R-2 and R-3 are connected in series, the resistor R-3 also being connected to the positive terminal of the battery 7. The resistor R-2 is connected in parallel with a switching relay 52 having normally closed contacts 53, 54 which open and close in response to energization of a coil 55 in the circuit of the fixed contact 18 in the operating lamp switch 8. When the switch operator 22 is in its inoperative position and the hazard warning switch operator 50 is in its inoperative position as shown in FIG. 1, the relay contacts 53 and 54 are closed, thereby shunting the resistance R-2. The resistance R-3 will be in circuit with the flasher 40 via the resistor R-2, but since full battery potential to the flasher 40 is available via the movable contact 21, the signaling lamps will burn at their highest intensity. With the switch operator 22 in its inoperative position and with the hazard signal switch operator 50 in its operative position, full battery potential is available to the flasher 51 via the circuit breaker 9, the movable contact 21, and the relay contacts 53 and 54. Thus, the hazard signal lamps will burn at their highest intensity. When the operator 22 is adjusted to either of the operative positions illustrated in FIGS. 2 and 3, however, a circuit is completed from the battery 7 to the coil 55 via the contacts 11 and 18 and either the movable contact 20 or movable contact 21, thereby energizing the coil 55 and opening the contacts 53 and 54.

When the operating member 22 is moved from its inoperative position to the operative position shown in Fig. 2 to actuate the parking and tail lamps, the movable switching contact 21 bridges the fixed contacts 11 and 18, thereby energizing the relay coil 55 which opens the contacts 53 and 54. If the hazard switch operator 50 remains in its inoperative position, either the left-hand or the right-hand direction signal lamps may be connected to the battery 7, but in this instance both of the resistors R-2 and R-3 will be inserted in the direction signal circuit, thereby dimming the brilliance of the signal lamps. The same result is obtained when the operating member 22 is moved to the position shown in FIG. 3, but in this instance it is the movable switching contact 20 which bridges the contacts 11 and 18, whereas the movable contact 21 connects the headlamps to the battery via the circuit breaker 12.

When the operating member 22 is moved to either of its operating positions and the hazard signal operator 50 is moved to its operative position, a circuit from the battery is completed to all of the signal lamps 24–27 via the switch 41, the flasher 51 and the resistor R-3 which is inserted in the circuit by reason of the movement of the movable contact 21 out of engagement with the fixed contact 17. All four signal lamps will flash simultaneously, the resistor R-3 and the inherent resistance of the four signal lamp filaments dimming the lamps' brilliance.

In the circuit disclosed in FIGS. 1, 2 and 3, the flashers 40 and 51 should be of the type which enables the flashing rate of the signal lamps to remain substantially uniform, regardless of the varying current supplied thereto. Such flashers are conventional and are known as variable load flashers.

The variation in the intensity of the illumination of the signaling lamps is achieved by the incorporation of simple, inexpensive resistors and an inexpensive relay. Moreover, the resistors and the relay are protected against overload by the circuit breaker 9.

Although reduced brilliance of the signaling lamps is desirable during the hours of twilight and darkness, that is, when the switch operator 22 is in a position to illuminate the tail lamps and either the parking lamps or the head lamps, it also is desirable that the signaling lamps, even when conditioned for reduced intensity operation, operate initially at an intensity level higher than that at which they subsequently operate, thereby assuring attracting the attention of other drivers upon the initiation of operation of the signal lamps. Such an operation may be achieved by forming the resistors R–1, R–2 and R–3 of a resistance material the resistance of which increases directly according to its temperature. A suitable resistance material of this kind is an alloy composed of substantially 70 percent nickel and 30 percent iron. Such material is manufactured and sold under the trademark "Balcot" by the Wilbur B. Driver Co. When such material is utilized for the resistors, they have a relatively low resistance when cool so that they offer little resistance in the circuit of the signal lamps at the beginning of their operation. Thus, the signal lamps initially will have a relatively high level of brilliance regardless of the position of the operating member 22. When the resistors are inserted in the signaling lamp circuit, however, continued operation of the signal lamps will cause the temperature of the resistors to increase, thereby increasing their resistance and effectively dimming the signaling lamps.

The construction illustrated in FIGS. 4, 5 and 6 is the same as that previously described with the exception that the single-pole relay 52 is replaced by a double-pole relay 52a. The relay 52a is identical to the relay 52 except that the relay 52a has an additional set of normally open contacts 56 and 57 which close upon energization of the coil 55, thereby inserting a resistor R–4 in parallel with the resistors R–2 and R–3 and the battery when the flasher 40 is conductive. The resistor R–4 serves as a shunt for the purpose of providing sufficient potential for the flashers 40 and 51 to enable them to function at the prescribed rate and without necessitating provision of a variable load flasher unit.

In the operation of the systems disclosed, positioning of the operator 22 of the operating lamp switch 8 in its inoperative position, as shown in FIGS. 1 and 4, shunts both of the resistors R–1 and R–2. Thus, closing of the brake switch 28 enables the rear signal lamps 26 and 27 to burn at their maximum intensity, and operation of the turn signal or hazard warning switches 29 and 41, respectively, enables the signaling lamps 24–27 to burn at their maximum intensity. Movement of the operator 22 to either of its operative positions, however, inserts the resistors R–1, R–2, and R–3 in their respective circuits, whereupon closing of the brake switch 28 or operation of the switches 29 or 41 will cause the appropriate signaling lamps to burn at a lower intensity, except for the initial higher brilliance operation due to the temperature-sensitive resistance material from which the resistors are made.

The disclosed embodiments are representative of presently preferred forms of the invention, but are intended to be illustrative rather than definitive thereof. The invention is defined in the claims.

I claim:

1. In a vehicle having a source of electrical energy, a first signal lamp circuit, a second signal lamp circuit, an operating lamp circuit, first signaling switch means movable between positions in which said first signal lamp circuit is connected to and disconnected from said source, second signaling switch means movable between positions in which said second signaling lamp circuit is connected to and disconnected from said source, and operating means movable between operative and inoperative positions in which said operating lamp circuit respectively is connected to and disconnected from said source: first and second resistances; and switching means responsive to movement of said operating means to said operative position to insert one of said resistances in said first signal lamp circuit and both of said resistances in said second signal lamp circuit, said switching means being responsive to movement of said operating switch means to said inoperative position to shunt both of said resistances.

2. The construction set forth in claim 1 wherein said switching means comprises a relay.

3. The construction set forth in claim 1 including third resistance means; and second switching means responsive to movement of said operating means to said operative position to insert said third resistance means in said first signaling circuit and responsive to movement of said operating means to said inoperative position to disconnect said third resistance from said first signaling circuit.

4. The construction set forth in claim 3 wherein said second switching means comprises a relay.

5. The construction set forth in claim 1 wherein the resistance of said first and second resistances varies directly according to the temperature thereof.

6. Variable intensity signaling apparatus for a vehicle having a source of electrical energy, said apparatus comprising a direction signal circuit having left-hand and right-hand signaling lamps; direction signal switch means for selectively connecting and disconnecting said left-hand and said right-hand signaling lamps to and from said source; a hazard signal circuit; hazard signal switch means for connecting said left-hand and said right-hand signaling lamps simultaneously to said source; an operating lamp circuit; operating switch means movable between inoperative and operative positions in which said operating lamp circuit respectively is disconnected from and connected to said source; first resistance means; second resistance means; switching means responsive to movement of said operating switch means from its inoperative position to its operative position to insert only said first resistance means in said hazard signal circuit and to insert both said first and second resistance means in said direction signal circuit, said switching means being operable to shunt both said first and said second resistance means in response to movement of said operating switch means from said operative position to said inoperative position.